Aug. 24, 1937.  A. COMPARE  2,090,746
AUTOMATIC RECORD CHANGER FOR PHONOGRAPHS
Filed Dec. 6, 1934   12 Sheets-Sheet 3
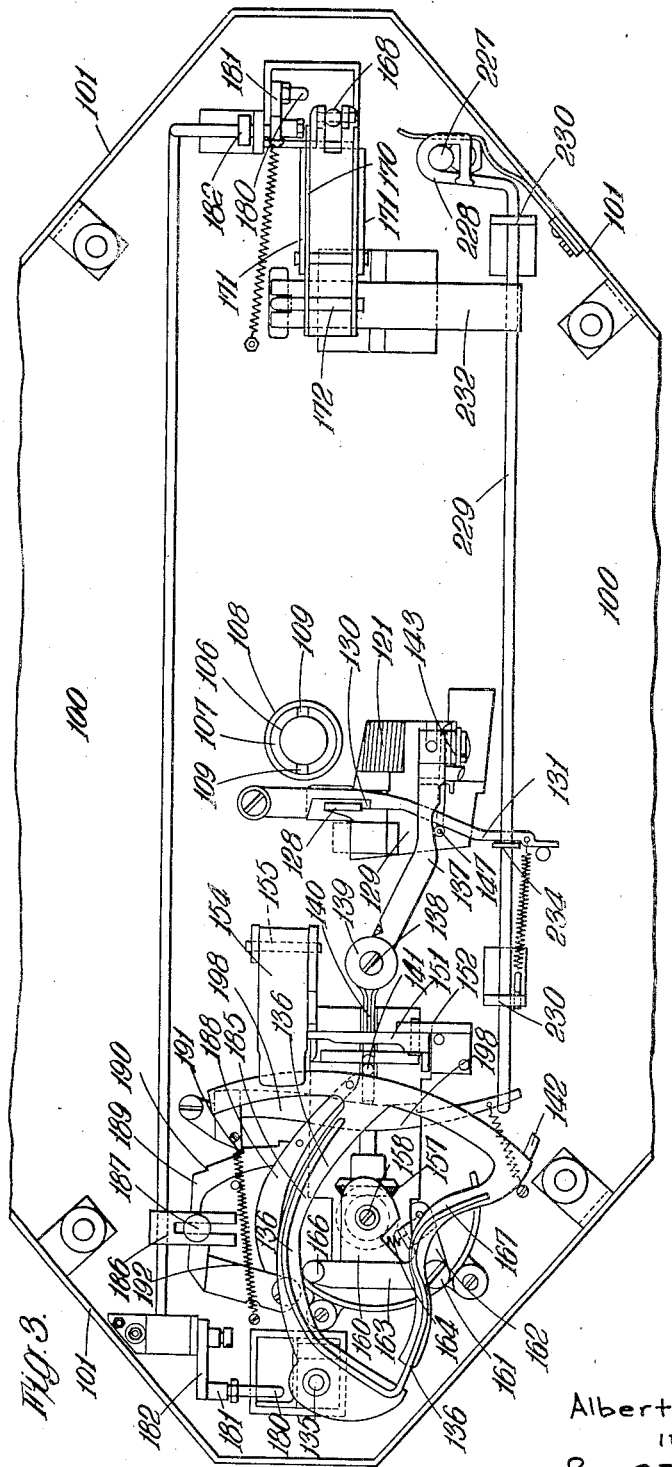
Alberto Compare
INVENTOR
his ATTY.

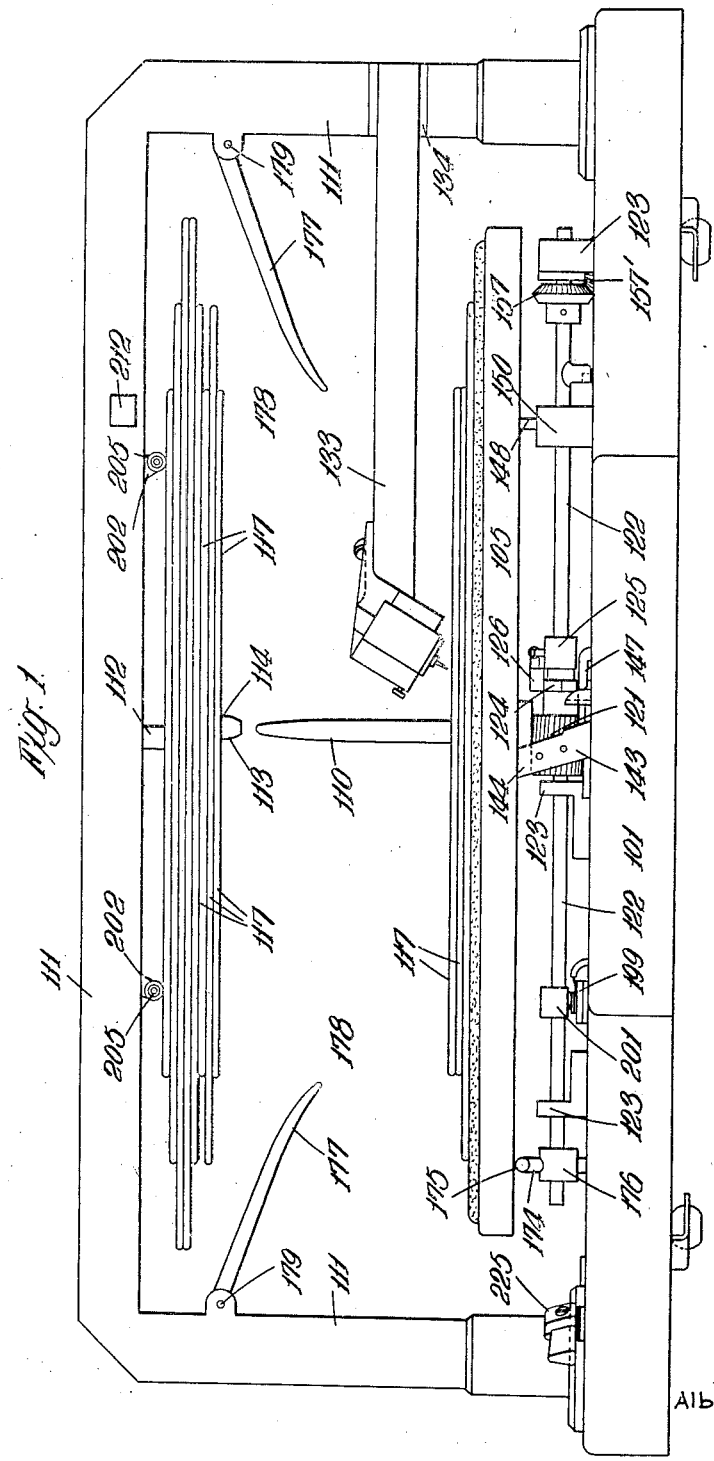

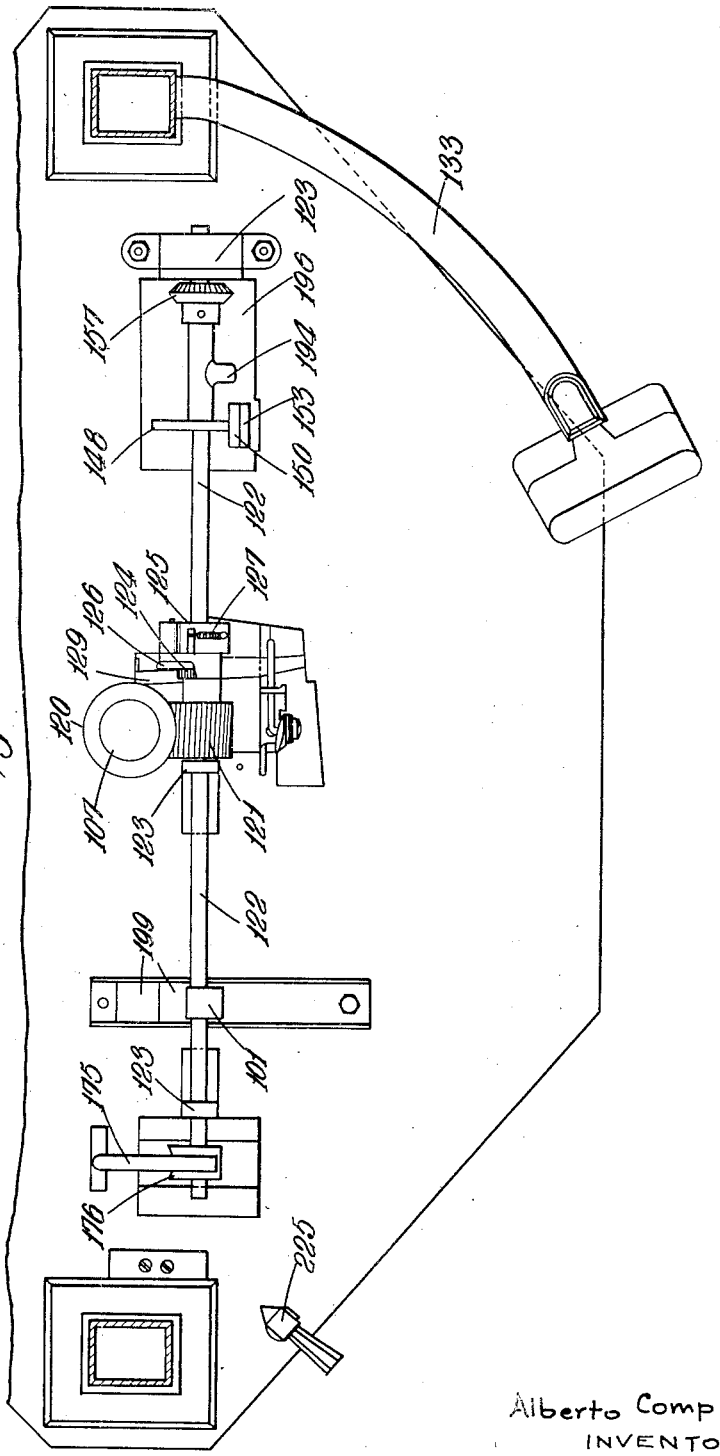

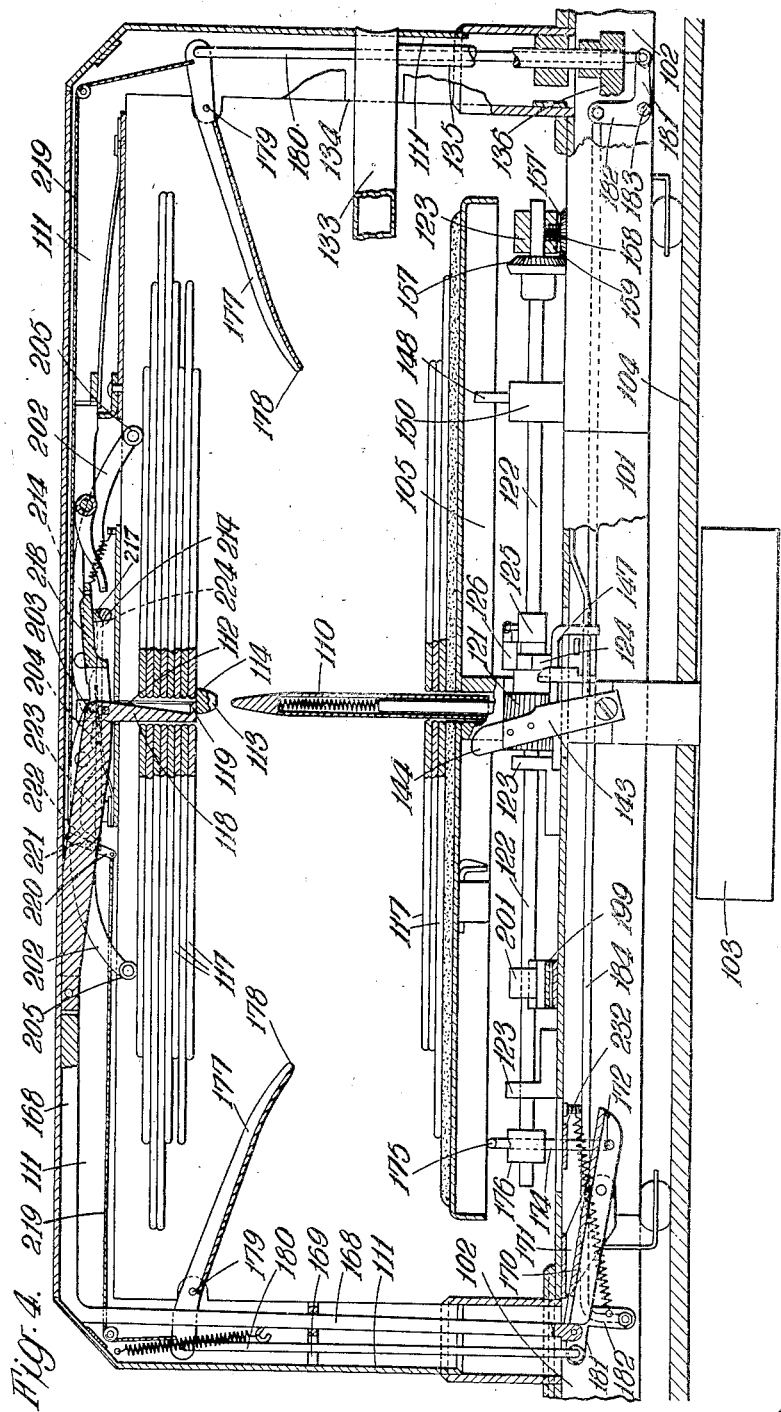

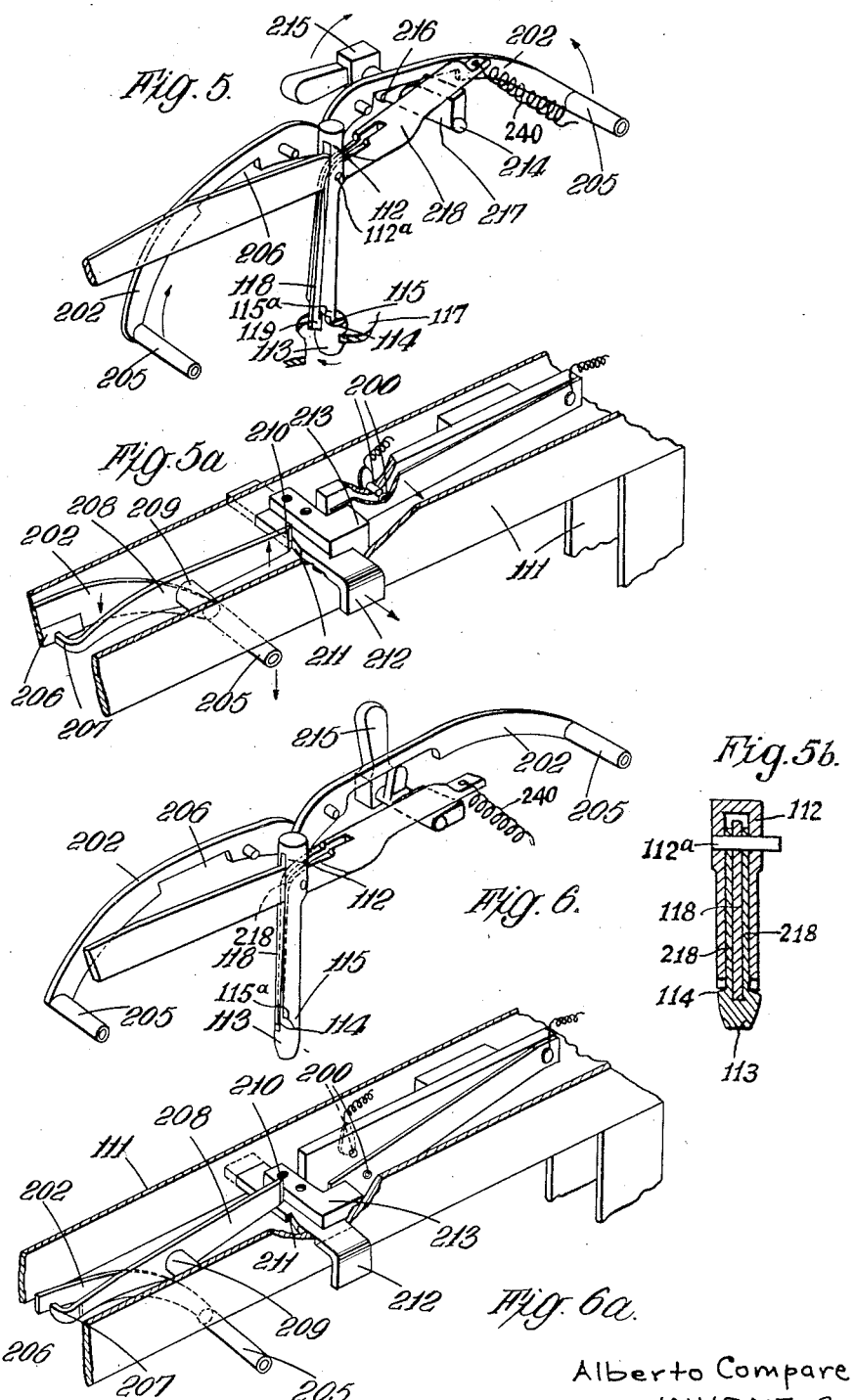

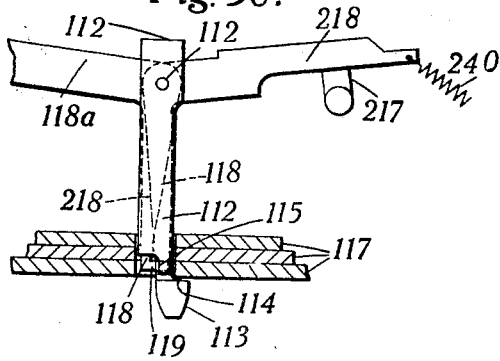
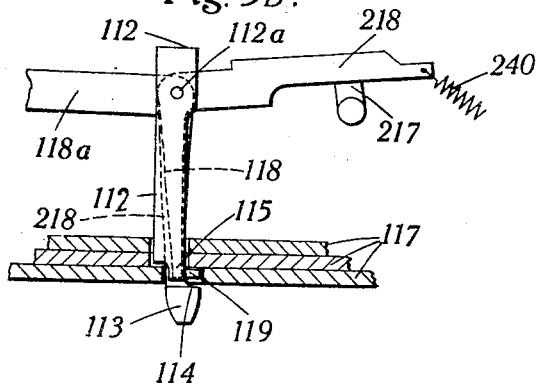
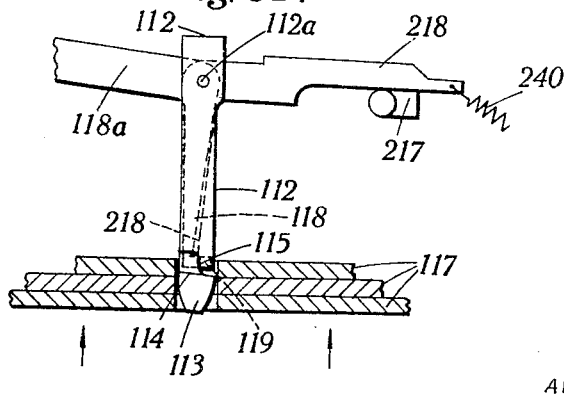

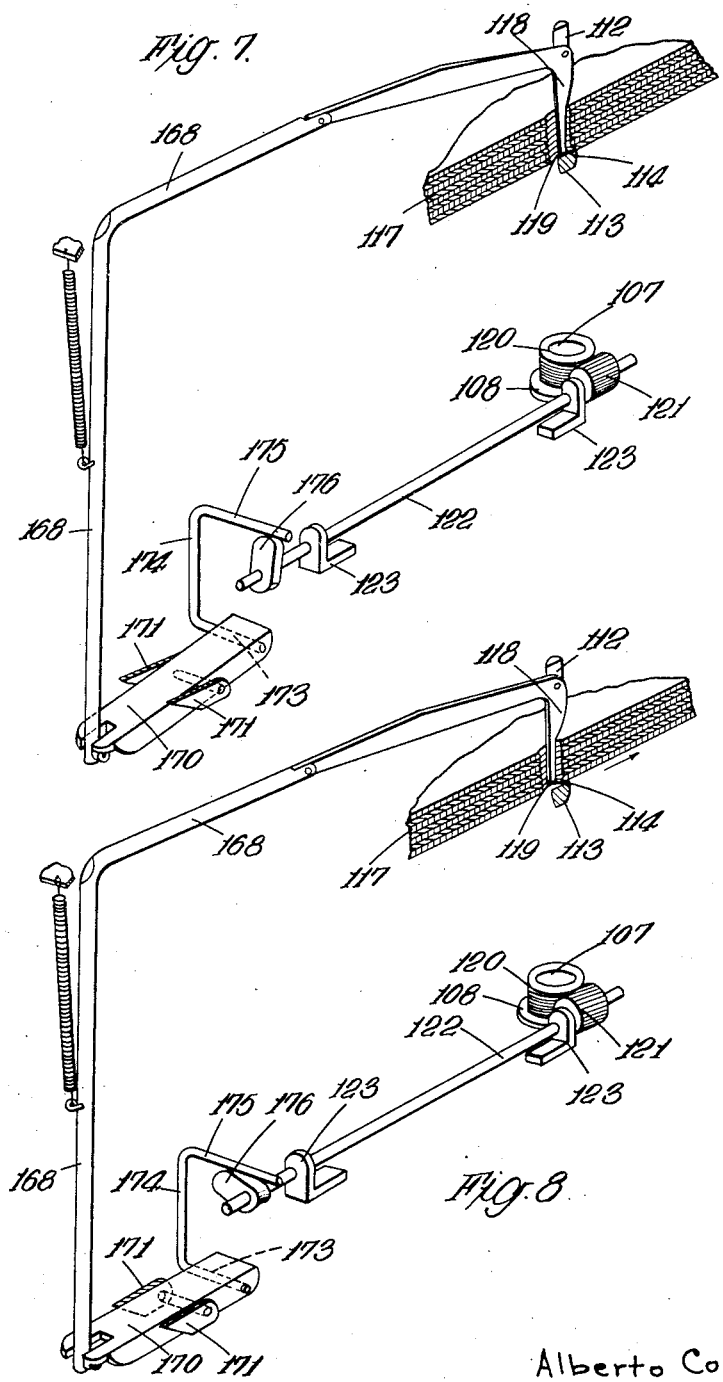

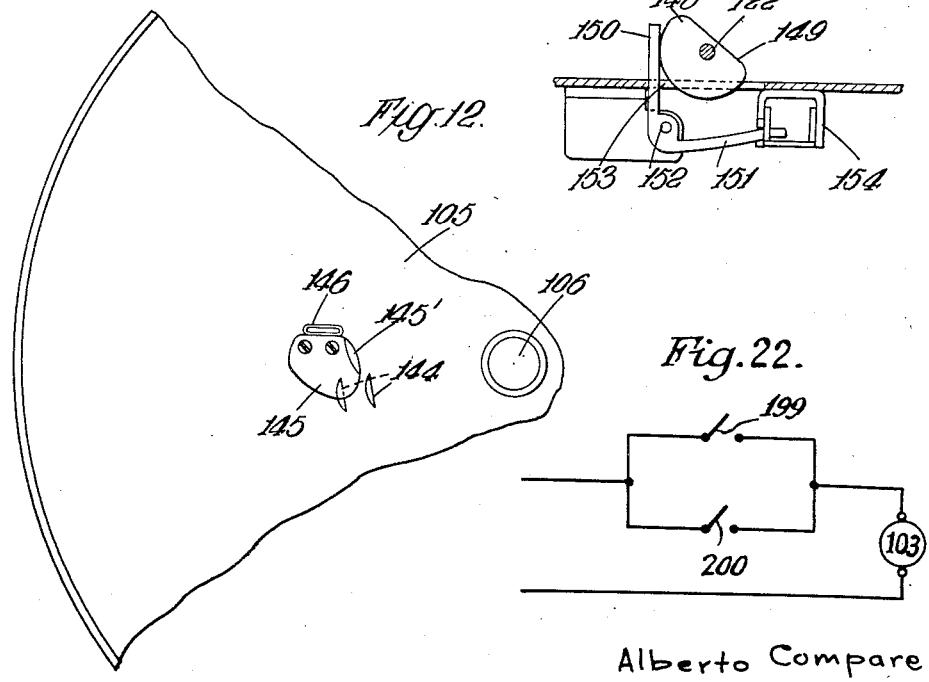

Aug. 24, 1937.  A. COMPARE  2,090,746
AUTOMATIC RECORD CHANGER FOR PHONOGRAPHS
Filed Dec. 6, 1934   12 Sheets-Sheet 9
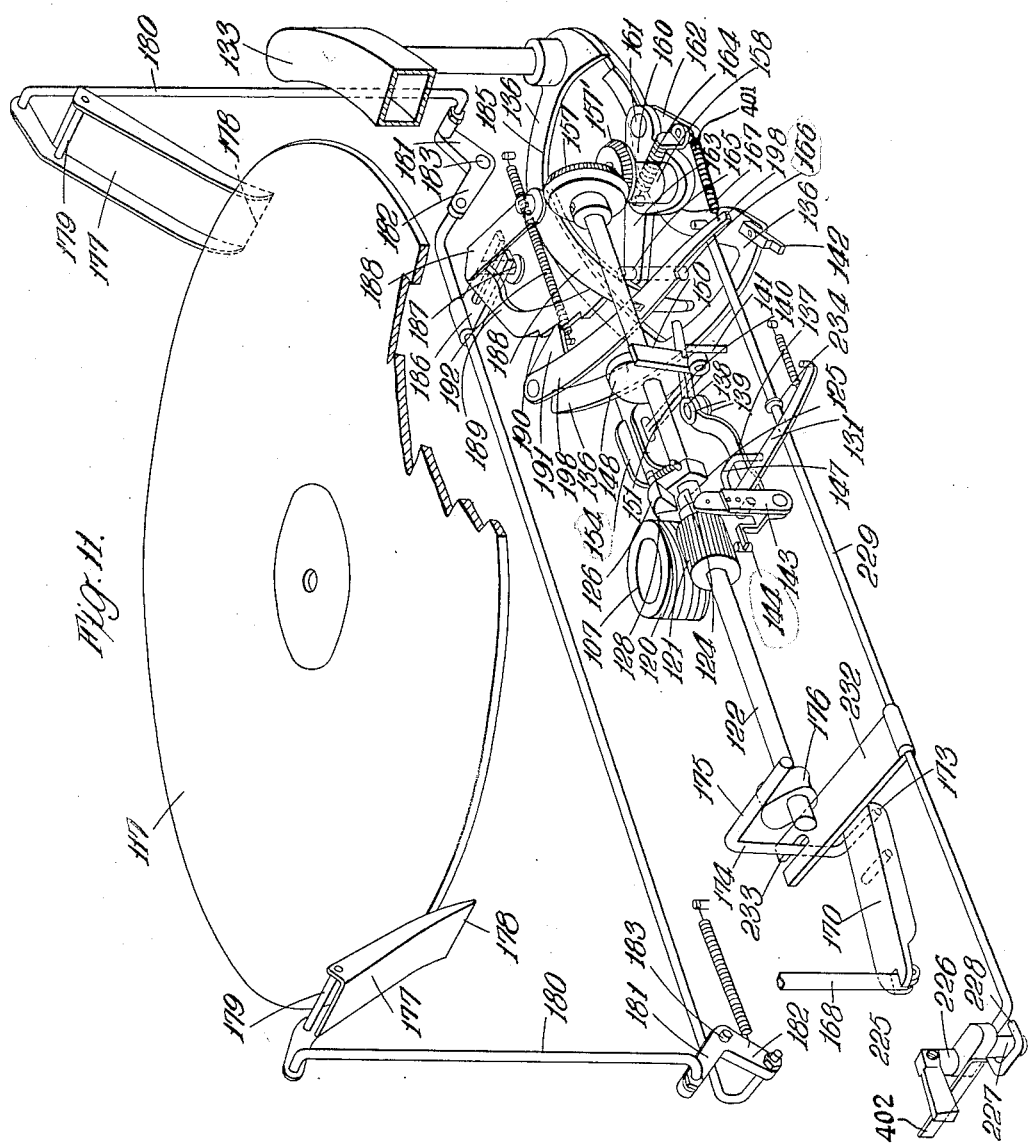
Alberto Compare
INVENTOR
By Otto Munk
his ATTY

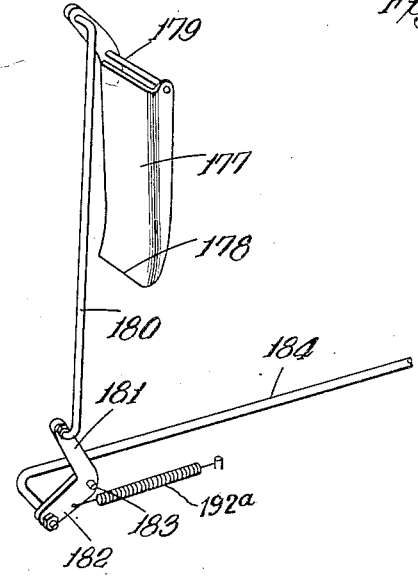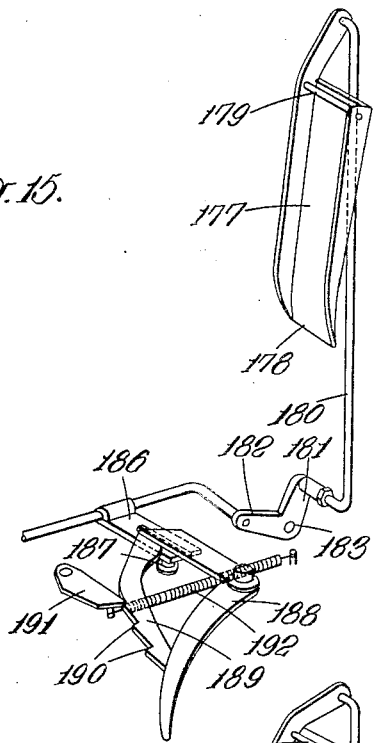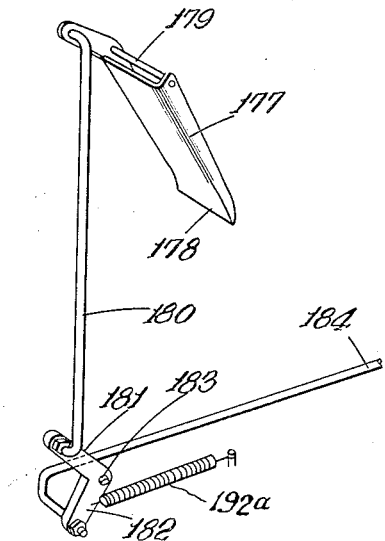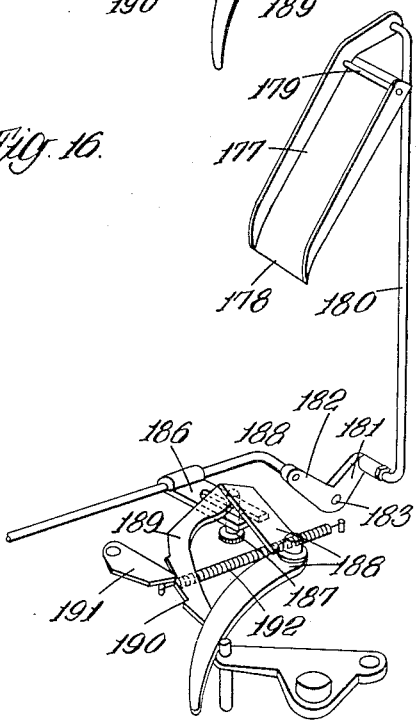

AUTOMATIC RECORD CHANGER FOR PHONOGRAPHS
Filed Dec. 6, 1934     12 Sheets—Sheet 11
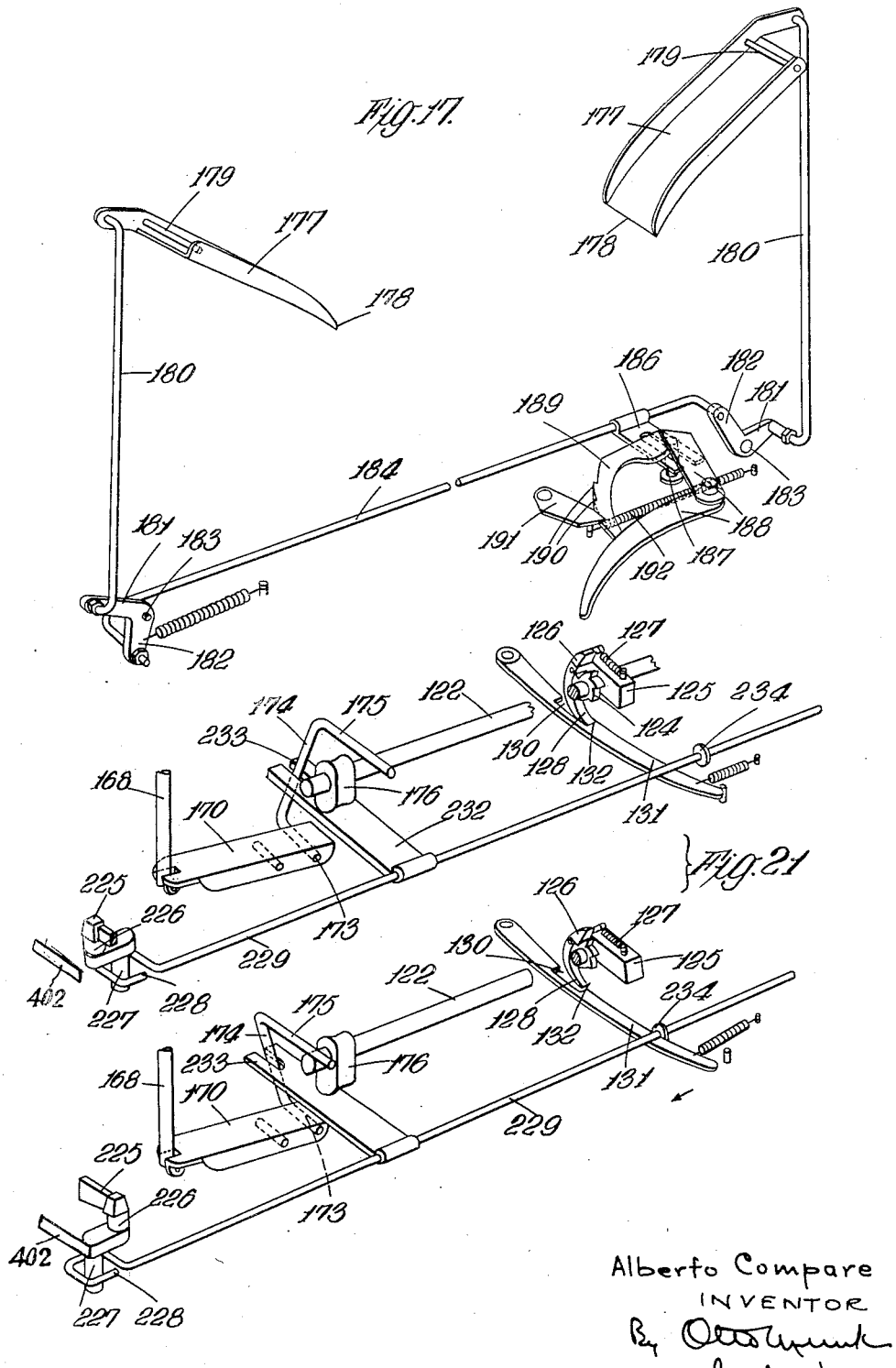

Alberto Compare
INVENTOR

UNITED STATES PATENT OFFICE 2,090,746

AUTOMATIC RECORD CHANGER FOR PHONOGRAPHS

Alberto Compare, Pinner Hill, Pinner, England, assignor to Charles Leslie Franks, Rosa Perpetua Franks, and Hubert Vaughan Mason, London, England Application December 6, 1934, Serial No. 756,254
In Great Britain April 19, 1934

17 Claims. (Cl. 274—10)

This invention relates to mechanisms for playing a number of gramophone records in succession. The many types of mechanism designed for this purpose all involve means for moving the pick-up or tone arm away from the turntable at the end of the playing of a record or on the actuation of a device for stopping the playing, and means for returning the pick-up to the appropriate position on the record to begin playing. Many of the prior mechanisms have, however, only been able to play records of one diameter, that is to say, any given set of records to be played in succession must all have been of one diameter. Those mechanisms that have been able to play records of different diameters, which may conveniently be described as mixed records, have generally been extremely complicated and expensive. The invention aims at providing an improved and simple mechanism capable of playing mixed records and arranged so that it is particularly easily loaded with records.

The invention makes use of what may be termed a magazine post, that is to say a post located above the turntable at least during the playing of the records and adapted to support them, the records being released from the post one by one to drop on to the turntable.

According to the invention a mechanism comprises a magazine post located above the turntable during the playing of the records and adapted to support the records, means for releasing the records one by one from the magazine post, a number of feelers interconnected so that their movements must be simultaneous and similar and disposed about the path of the edge of any record above a predetermined minimum diameter so as to be engaged by any such record as it falls and displaced by the record to an extent that corresponds to the diameter of the record, and means for moving the pick-up or tone arm inwards to an extent controlled by said feelers. By such an arrangement records of three or more different diameters may be played.

According also to the invention a magazine post comprises at least one fixed part and at least one movable part capable of moving relatively to the fixed part into a position in which the post constitutes a smooth spindle on which the records may easily be threaded and into another position in which the post presents a shoulder engaging the underneath of the lowermost record and supporting the stack of records. Preferably the magazine post includes a further movable part adapted on moving to engage the edge of the central aperture of the lowermost record and to push this laterally until the central aperture passes over the shoulder and the record drops from the post.

A magazine post according to the invention may be made completely self-contained so that it acts as an independent unit, alone serving to support the records during the whole time that they have to be supported but capable of being made smooth to facilitate loading.

In order that this invention may be the more clearly understood and readily carried into effect, I will proceed to describe the same with reference to the accompanying drawings, which illustrate by way of example and not of limitation one convenient embodiment of this invention, and in which Figure 1 is a side elevation of the complete machine.

Figure 2 is a sectional plan thereof,

Figure 3 is an underplan, and

Figure 4 is a section through the apparatus taken in a vertical plane.

Figures 5, 5a, 5b and 6, 6a are detailed perspective views of the record feed and its associated mechanism.

Figs. 5c, 5d, and 6b are sections through the record feed and its associated mechanism in three different conditions of the same.

Figures 7 and 8 are detailed views of the release mechanism.

Figure 9 is a further detailed view of part of the mechanism.

Figure 10 is a local section through part of the bridge structure showing the mounting of the pick-up arm.

Figure 11 is a perspective view of the operating mechanism.

Figure 12 is an underplan view of the turntable.

Figure 13 is a view showing the stop on the underside of the turntable.

Figure 14 is a local section 14—14 of Figure 2.

Figures 15, 16, and 17 are detail views showing the means for setting the mechanism in accordance with the diameter of the record fed.

Figure 18:
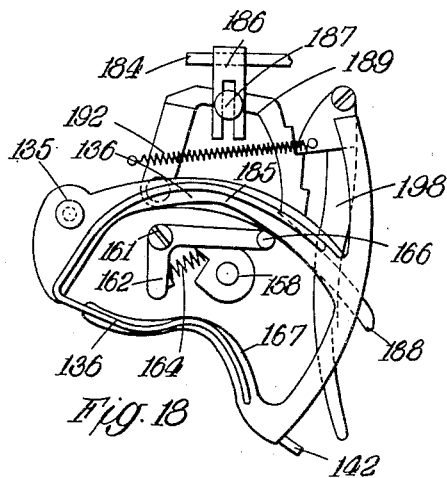

Figure 18 is a detailed underplan view showing one position of the pick-up arm control frame.

Figure 19:
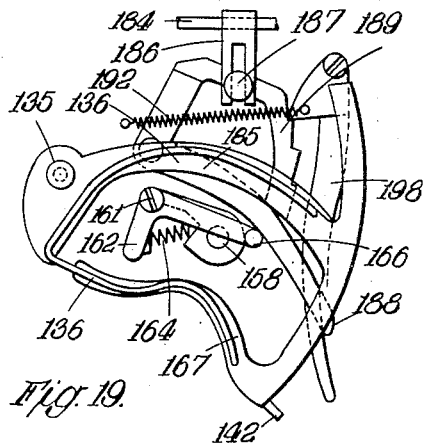

Figure 19 is a similar view showing the same parts in a different position.

Figure 20:
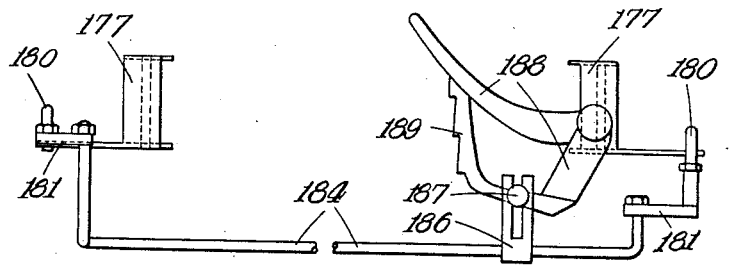

Figure 20 is a detail view showing the gauge arm returning mechanism.

Figure 21 is a view showing the repeat and reject mechanism in two different positions.

Figure 22 shows an electrical circuit diagram illustrating the manner in which the switches and motor are connected.

Referring now to the drawings, the apparatus therein illustrated comprises a motor board 100 which may be provided with down-turned edges 101 so as to provide under the motor board an enclosed space 102 within which the major part of the mechanism is enclosed (see Figure 4). The motor 103 may be definitely secured to the underside of the motor board 100, if desired, but it is preferred to mount the motor itself definitely on a sub-motor board 104 on which the motor board 100 above referred to is in turn mounted. On the upper surface of the motor board is disposed the turntable 105, this turntable being coupled up with the motor in any way, say, for example, by means of a tapered spindle 106 fixed to the underside of the turntable, which spindle takes into a correspondingly tapered sleeve 107 mounted in a bush 108 in the motor board. The lower end of the sleeve 107 projects beyond the lower end of the bush 108 and is provided with clutch slots 109 adapted to be engaged by like projections on the motor spindle so that the sleeve 107 and hence the turntable 105 may be driven by the motor 103. The turntable 105 is provided with an upwardly projecting spindle 110 which is of telescopic construction.

A bridge structure 111 is provided on the motor board 100 to span the turntable diametrically. This bridge structure is of U-shape in cross-section and near the centre a forked rod 112 projects downwards from it. This rod encloses a second forked rod 218 pivoted at 112a, the arms of which are united in an offset base 113. The rods 112 and 218 together constitute the magazine post, and the release member is constituted by a lever 118, which is also pivoted at 112a and which is formed with a toe 119 that moves just above the upper surface 114 of the base 113 when the lever 118 is rocked. The rod 112 is eccentric to the turntable spindle 110, but the base 113 is normally concentric with the turntable spindle, since the rod 218 which carries the base is subjected to the action of a spring 240. When a set of records is to be threaded on the magazine post the rod 218 is rocked to bring the base 113 concentric with the rod 112 as shown in Figure 6 and in Figure 6b, and when the records are on the post the rod 218 is allowed to rock back again so that the surface 114 forms a shoulder which supports the records as shown in Figure 5c. During the actual loading of the records on the post the turntable spindle 110 may be depressed against an internal spring (see Figure 4). The normal position of the various parts during the playing of a record is shown in Figure 4, where there is a stack of records 117 on the magazine post.

The rod 218 is actually rocked by the rotation of a cam 217 carried on a spindle 214 which is furnished with an operating knob 215. When the knob 215 is turned from the position shown in Figure 6 to that shown in Figure 5 after a set of records has been threaded on the post, it serves to maintain the base 113 eccentric to the rod 112 and thus to lock the records 117 on the post.

The release of the lowermost record is effected by the release lever 118. This is rocked through the medium of a connecting rod 168 (Figures 7 and 8) which is connected to an arm 118a rigid with the lever 118. When rocking occurs, the toe 119 engages the edge of the central aperture of the lowermost record and pushes it until the aperture registers with the base 113 as shown in Figure 5d, whereupon the record falls by gravity onto the turntable and over the turntable spindle. To allow the lowermost record to slide laterally on the base 114, the rod 112 is cut away somewhat, as shown at 115.

The records above the lowermost record are unaffected by the movement of the lever 118, but when the lever 118 returns to its normal position, the whole set of records moves down until that record which is now the lowest rests on the shoulder 114 of the base 113.

That part of the rod 112 which lies immediately above the cut away part 115, serves as an abutment 115a. The height of this abutment 115a above the surface 114 of the base 113 is slightly greater than the thickness of each record that the mechanism is designed to play. Thus, when the lowermost record is moved laterally to enable its central aperture to clear the base 113 and fall onto the turntable, the lowermost record but one is prevented from moving laterally by the abutment 115a, so that there is no risk of the lowermost record carrying one or more records laterally upon it and of two or more records being discharged simultaneously on to the turntable.

The sleeve 107 driven by the motor 103, as above described, is provided with a worm wheel 120 which engages with a pinion 121 loosely mounted on a main control shaft 122 which is rotatably mounted in brackets 123 on the upper side of the motor board 100. At the appropriate time, this pinion 121 is adapted to be coupled up to the main control shaft 122 so as to drive the same, and for this purpose the pinion 121 is provided at one end with a ratchet wheel 124 and on the control shaft 122 is fixed a collar 125 having mounted thereon a spring-controlled pawl 126, the spring 127 of which functions normally to keep the pawl 126 in engagement with the ratchet 124 so that the control shaft 122 is driven. This pawl is, however, provided with a curved extending arm 128 which, at a certain point, is adapted to pass through an aperture 129 in the motor board 100 so that its outer curved surface bears upon the upper face of an arm 131 (hereinafter termed "the release arm") pivoted at 132 on the underside of the motor board 100. When the extended arm 128 of the pawl 26 bears upon the upper face of the release arm 131 further movement of the arm 128 is prevented (see the upper view in Figure 21) but the collar 125 continues its movement slightly and so rocks the pawl arm 126 and disengages the pawl from the ratchet 124. When the pawl 126 is disengaged from the ratchet 124, the whole of the mechanism is at rest, the motor 103 merely driving the pinion 121 idly on the main control shaft 122.

In order to set the mechanism in operation again, it is necessary to release the pawl arm 126 from the release arm 131, and this is done by swinging the release arm 131 about its pivot 132 so as to clear the same from the pawl arm 126. The manner in which this is automatically effected at the appropriate moment will be hereinafter described.

*Pick-up arm mounting*

The pick-up arm 133 is mounted in one of the vertical parts of the bridge structure 111 (see Figure 10) which is cut away as at 134 so as to allow of the necessary movement of the pick-up arm 133. The end of the pick-up arm 133 within the level of the motor board 100 and is attached to a control frame 136 which extends horizontally under the motor board 100 (see Figures 4, 18, and 19). The shape of this control frame will be described hereinafter. It will be appreciated that this control frame 136 moves with the pick-up arm 133, the arc through which it moves being the same as that through which the pick-up arm moves.

Control means

The mechanism must, it will be appreciated, function when the playing of one record has finished and must remain idle until the playing has finished. From the above description of the release arm 131 and method of driving the main control shaft 122, it will be appreciated that all that is necessary is that the release arm 131 should be moved from the position shown in the upper view in Figure 21 to the position shown in the lower view in Figure 21 at the end of the playing of one record and that all the necessary movements of the mechanism should be effected in a single turn of the main control shaft 122. The manner in which the single turn of the control shaft 122 is used to effect all the necessary movements will be hereinafter described, but I will now describe the means whereby the mechanism is set in motion at the required moment. The mechanism comprises an arm 137 which is pivoted as at 138 on the underside of the motor board 100 (see Figure 11) near the pick-up arm control frame 136 and which on that side which projects towards the pick-up arm control frame has provided about a disc 139 forming the pivot boss a further lever 140 mounted friction-tight thereon so that the arm 137 and the lever 140 normally move as a unit about the pivot 138. This arm 137 is hereinafter called the "control arm" and the lever 140 is provided with a downwardly depending pin 141 which lies in the path of a lug 142 on the pick-up arm control frame 136. Thus, as the pick-up arm control frame 136 gradually moves over due to the radially inward movement of the pick-up following the sound groove, so will the lever 140 just referred to gradually move about its pivot. The positioning of the parts is such that the end of the lever remote from the end which is engaged by the arm above described moves outwardly away from the centre of the turntable, the friction in the pivotal mounting between the control arm and the lever pivoted thereon causing these two parts normally to move as a whole. The other end of the control arm 137 is provided with a pivoted arm 143 (hereinafter termed the "upturned end" of the control arm"). This upturned end 143 of the control arm 137 passes through a slot in the motor board 100 under the turntable, and that face of the upturned end which is remote from the centre of the turntable is curved to cylindrical form as at 144 (see Figure 12).

Appropriately mounted on the underside of the turntable 105 is a lug 145, the inner face 145' of which, i. e., the part facing the centre of the turntable, is shaped similarly to the face 144 of the upturned end 143 of the control arm 137 but which, in addition, is provided with a tail part 146 which extends radially outward.

This lug 145 is, of course, maintained at a fixed distance from the centre of the turntable and rotates in a circle with the turntable (see (Figure 12).

The upturned end 143 of the control arm 137 is the turntable 105 (see Figure 12), and it will be seen that, as the pick-up gradually moves towards the centre of the record, so will the upturned end 143 of the control arm 137 approach the circle of rotation of the lug 145 until finally it will be engaged by the lug 145 as it travels round. The radial movement of the upturned end 143 of the control arm 137 for each rotation of the turntable is very small and thus, when the lug 145 engages with the upturned end of the control arm, it will only be the curved surfaces 144 and 145' which will contact and the lug 145 will push the upturned end 144 of the control arm 137 back until it clears the same. The movement of the control arm 137 is allowed to take place by a small amount of "give" or movement of the friction-tight joint between the control arm 137 and the lever 140 pivoted thereon. Thus the control lever 140 will continue its gradual swing under the influence of the movement imparted to the pick-up control frame due to the sound track unimpeded, whilst the upturned end of the control arm 137 will remain at or closely adjacent to the circle of rotation of the lug 145. The lug 145 will engage with the upturned end 143 of the control arm 137 at each rotation of the turntable since the radial movement of the upturned end 143 of the control arm 137 for any one normal rotation of the turntable is insufficient to cause the same to clear the lug. Now, at the end of the playing of the record, the needle enters a quick spiral groove and, during the rotation of the turntable, the movement of the pick-up arm will be comparatively great. This movement of the pick-up arm will, of course, be transmitted to the control lever 140 and is such that it moves the upturned end 143 of the control arm 137 clear of the lug 145 whilst leaving it, however, still in the path of the tail 146 on the lug 145. Thus, when the lug 145 reaches the position of the upturned end 143 of the control arm, the tail 146 engages with the same (see the broken line position of Figure 12). Now this arrangement of the tail 146 of the lug 145 with the control arm 137 is entirely different to the engagement of the lug 145 itself with the same for when the lug 145 engages with the upturned end 143 of the control arm 137 it is merely a matter of two oppositely disposed curved surfaces (144 and 145') rubbing one over the other and so the friction-tight joint between the control arm 137 and the control lever 140 gives. When the tail 146 of the lug 145 engages with the upturned end 143 of the control arm 137 it engages not with the curved surface 144 thereon but with the side, thereby depressing the upturned arm pivoted on the end of the control arm 137, the tail 146 finally sliding over the arm 143. Attached to the arm 137 is a further arm 147 which is bent downwardly to take over the release arm 131. Thus, as the arm 143 swings about its pivot, it takes with it the further arm 147. This movement causes the release arm to be swung about its pivot to release the pawl arm. The movement of the release arm 131 is clockwise as seen in Figure 21 so that the arm 128 slips over the right hand edge of the release arm 131 and the pawl 126 is free to engage the ratchet 124. A slot 130 is provided in the release arm 131 because the latter is returned to its normal position (i. e. that shown in the upper part of Figure 21) before the arm 128 has rotated very far. In the absence of the slot 130, the release arm would, upon such return movement, foul the the release arm is held until the quick movement of the pick-up arm takes place. When the release arm is moved, the pawl arm is disengaged and the spring on the pawl arm engages the pawl with the ratchet. The main control shaft is, therefore, coupled up with the motor and is caused to rotate.

Pick-up arm raising means

It will be appreciated that the pick-up must be raised clear of the record that has just been played before it is swung outwardly and also before a new record is fed from the store to the turntable. This is effected by means of a cam 148 on the main control shaft 122 which is in the form of a disc provided with a flat 149. This cam 148 engages a bell crank lever 150, 151 pivoted in a bracket 152 on the underside of the motor board 100 and extending as to one arm 150 up through an aperture 153 in the motor board 100 so that it may be engaged by the cam 148. The horizontal arm 151 of this bell crank lever 150, 151 engages in a member 154 pivoted as at 155 on the underside of the motor board 100. The free end of this pivoted member 154 at all times engages with the pick-up arm control frame 136. Now, in addition to the swinging movement in a horizontal plane necessary for the playing of the record, the pick-up arm must, of course, be capable of a certain amount of movement in a vertical plane in order that the pick-up may from time to time as is necessary be raised clear of the record. This is effected by mounting the vertical tube 135 in the bridge structure 111, to which the pick-up arm 133 is fixed, on horizontal pivots 156 within the bridge structure. The playing position of the pick-up arm is down, and this will, of course, result in the forward edge of the pick-up arm control frame 136 which extends under the bridge structure also being down. The pick-up arm control frame 136 bears on the pivoted member 154 above described and so depresses the same. In order, therefore, to raise the pick-up arm, it is necessary to raise the pivoted member 154 and this is effected by means of the bell crank lever 150, 151. The normal at rest position of the cam 148 on the main control shaft 122 is with the flat 149 bearing against the vertical arm 150 of the bell crank lever 150, 151, and this allows the pivoted member 154 to fall and hence allows the pick-up arm to move into its playing position. As soon, however, as the main control shaft 122 commences to rotate, the flat 149 on the cam 148 moves away from the vertical arm 150 of the bell crank lever 150, 151 which is thereupon engaged by the circular part of the cam 148. This swings the bell crank lever 150, 151, raises the pivoted member 154 and hence raises the pick-up arm 133 clear of the record. This position, the pick-up arm raised, will be maintained until the end of the rotation of the main control shaft 122, when the flat 149 again comes into engagement with the vertical arm 150 of the bell crank lever 150, 151 and allows the pick-up arm 133 to fall. The pick-up 133 is, therefore, raised clear of the record immediately the record is played and is only lowered so as to be capable of again engaging with the record at the end of the complete sequence of movements.

Means for moving pick-up arm outwardly

After the pick-up has been raised clear of the record it is necessary that it should be moved outwardly from the store on to the turntable, and this movement must be sufficient to allow the largest size of record that is to be played to fall. This movement is effected through the intermediary of the pick-up arm control frame 136 in the following manner. At one end of the main control shaft 122 is disposed a bevel pinion 157 which engages with a further bevel pinion 157' mounted on a short vertical shaft 158 journalled in a suitable bearing 159 in the motor board 100. This short vertical shaft 158 is, below the motor board, provided with an arm or plate 160 on which, at a point 161 eccentric with respect to the centre of the short vertical shaft 158, is pivoted a bell crank lever 162, 163. This bell crank lever is controlled by a tension spring 164 in such a manner that, as viewed from above the motor board, the bell crank lever 162, 163 is urged in a clockwise direction, it being capable, however, of a limited amount of movement in an anti-clockwise direction against the action of the tension spring 164. The end of one of the arms 163 of this bell crank lever 162, 163 (the leading arm when viewed from above as the vertical shaft rotates in a clockwise direction) is provided with two pins 165 and 166, one (165) of which extends upwardly, and the other 166 of which extends downwardly. The upwardly extending pin 165 plays a part only in the control of the return of the pick-up arm, as will be explained hereinafter.

Dealing now with the downwardly projecting pin 166, this is located within the pick-up arm control frame 136 and is so positioned relative to the shape of the pick-up control frame that the first part of its movement is idle (see Figure 18), i. e., it does not contact with the inner edge of the pick-up control frame or, alternatively, slides around a part which is concentric with respect to the axis of rotation of the short vertical shaft 158. It is during this idle movement of the pin that the pick-up is raised clear of the record, as above explained. When, however, the pick-up has been raised clear of the record, the pin 166 engages with an inwardly projecting part 167 on the pick-up arm control frame 136 (see Figure 19) and since the only resistance to its moving the pick-up control frame is the inertia of the pick-up arm, it moves the pick-up arm control frame 136, the spring 164 controlling the bell crank lever 162, 163 being sufficiently strong to overcome this inertia and the pick-up arm is thereby swung clear of the records (see Figure 19). The bell crank lever 162, 163 with its pin continues to rotate until it has made a complete turn (the gear ratio of the bevel gears being I to I) and then stops, due to the disconnection of the motor from the main control shaft.

After the pin has moved the pick-up arm outwardly it has an idle movement during which the record is changed and then has a working movement to return the pick-up arm (as hereinafter described) to complete the series of operation.

The changing of the record being the next operation of the series, this will now be described:—

Record changing mechanism

As above explained, in order to feed a new record from the store on to the turntable, it is merely necessary to move the finger 118 over towards the off-set part 113 of the rod 218, when the lowermost record will fall on to the turntable under its own weight.

such a manner as to give the desired movement and above the pivot is connected to a connecting rod 168 which lies within the U-shaped section of the bridge structure 111 and extends down one of the vertical parts thereof (the opposite part to that in which the pick-up arm is mounted, see Figures 7 and 8) to the underside of the motor board 100. In order, therefore, to change the record, it is merely necessary to move this connecting rod 168. To this end, the connecting rod 168, which is mounted in suitable slide bearings 169 within the vertical part of the bridge structure 111, is, below the motor board, connected to a plate 170 which is pivoted intermediate its ends in downwardly depending brackets 171 on the underside of the motor board 100, this plate 170 extending towards the turntable. The inner end of the plate 170 has pivoted in it on a horizontal axis 172 the lower turned-over end 173 of an arm 174 which extends up through the motor board 100 and is turned-over as at 175 so as to lie over the end of the main control shaft 122. At the appropriate point, the main control shaft 122 is provided with an outstanding boss 176 which, after the pick-up arm has been raised and moved outwardly, as above described, engages with the turned-over end 175 of the said arm 174 to raise the same (see Figure 7). In raising the arm 174 the boss 176 swings the pivoted plate 170 and so moves the connecting rod 168 to operate the finger 118 in the desired manner. It is important to remember that the arm 174 with which the boss 176 on the main control shaft 122 engages is pivoted in the pivoted plate 170 in such a manner that it can be moved clear of the boss. The use of this mounting will be described hereinafter. The arm is, however, normally kept in such a position that it engages with the boss 176.

*Pick-up arm returning means. (Figures 15, 16, and 17)*

Having raised the pick-up arm, moved the same outwardly clear of the record and fed a fresh record on to the turntable, as above described, it is now necessary to return the pick-up arm by an amount such that, when the pick-up is lowered, it shall be correctly positioned to commence playing the record of the size in question. This is effected by feelers or gauge arms or plates 177 which project inwardly from the two vertical parts of the bridge structure 111, the gauge arms, which are provided with down-turned ends 178, being pivoted at 179 within the vertical parts of the bridge structure 111. Each of the gauge arms or plates 177 is connected at its outer ends to a vertical connecting rod 180 which extends down the vertical part of the bridge structure and is connected at its lower end to one of the arms 181 of a bell crank lever 181, 182 pivoted at 183. The other two arms 182 of the bell crank levers are connected together by means of a rod 184 in such a manner that the gauge arms 177 work in unison with one another and in such a manner that the displacement of the horizontal coupling rod 184 connecting the gauge arms together is dependent upon the arc through which the gauge arms are moved. The gauge arms project inwardly from the vertical parts of the bridge structure over the turntable to such an extent that they are separated at their inner ends by an amount just slightly greater than the diameter of the smallest record to be played on the device, say an eight inch record (see sitioned below the record store and thus, as a record is fed from the store on to the turntable, it engages with the gauge arms and depresses the same by a certain amount (provided, of course, it is not a record of the smallest diameter to be played). In other words, the feeding of an eight inch record does not displace the gauge arms; the feeding of a ten inch record causes the gauge arms to swing about their pivots by a certain amount, and the feeding of a twelve inch record causes the gauge arms to swing about their pivots by a larger amount, due to its larger diameter as the gauge arms project over the turntable and have to be swung downwardly by a certain amount to allow the record to move past the same, the amount of swing necessary obviously depending on the diameter of the record.

After the feeding of the record, therefore, the horizontal coupling rod 184 under the motor board 100 can occupy one of three positions shown in Figures 15, 16, and 17, the actual position being selectively determined by the diameter of the record fed.

The pick-up arm is returned by reason of the downwardly depending pin 166 on the spring-controlled bell crank 162, 163 engaging with the final part 185 of the pick-up arm control frame 136, and the arrangement is such that for an unimpeded movement of the spring-controlled bell crank the pick-up arm is returned by an amount which just positions it over the first sound groove of the smallest record to be played.

In order to control the return movement of the pick-up arm, therefore, it is merely necessary to couple the horizontal coupling rod 184 with the spring-controlled bell crank lever 162, 163 so that the pick-up arm is swung through an arc which is inversely proportional to the displacement of the horizontal coupling rod 184 which is, as above explained, dependent on the displacement of the gauge arms. This is done by means of a stirrup 186 on the horizontal coupling rod 184 which takes about a pin 187 on an arcuate lever 188 suitably pivoted on the underside of the motor board 100. This arcuate lever 188 is provided with an extension 189 having ratchet teeth 190 with which a spring-controlled pawl 191 engages to prevent the return movement of the arcuate lever 188. In this manner, the arc through which the arcuate lever 188 is swung is dependent on the arc through which the gauge arms 177 are swung by the feeding of the record to be played, and the arcuate lever 188 is held in its adjusted position; hence the gauge arms 177 are maintained in their depressed position. The gauge arms 177 are, however, spring controlled by a spring 192 so that, when the pawl 191 is released from the ratchet teeth 190 on the extension 189 on the arcuate lever 188, they are returned to their raised position and the whole of the parts are likewise reset. The means for removing the pawl 191 from the ratchet teeth 190 will be described hereinafter. Now normally, i. e., when there is no movement of the horizontal coupling rod 184, the arcuate lever 188 is clear of the upwardly projecting pin 165 on the spring controlled bell crank lever 162, 163. Hence, as above explained, the spring controlled bell crank lever is not moved out of its normal position and the pick-up arm is swung right back towards the centre of the record. When, however, the arcuate lever 188 is moved, it becomes positioned in the path of the upwardly projecting pin 165 on the spring controlled bell crank lever and, as the the ratchet and pawl mechanism, the spring controlled bell crank lever is swung on its pivot against the action of its controlling spring 164, and this movement reduces the distance between the downwardly directed pin and the axis of rotation of the short vertical shaft (see Figure 16). Since it is upon the radius of the circle around which the pin moves on the last part of its movement that the amount by which the pick-up arm is returned depends, it will be appreciated that the distance through which the pick-up arm is returned will be dependent on the positioning of the arcuate lever. Hence, the movement transmitted to the arcuate lever is such that, for its smaller movement, the pick-up arm is returned through an arc which positions the pick-up over the first groove of a ten inch record and, for the larger of its two movements, the pick-up arm is returned by a less amount such that the pick-up becomes positioned over the first groove of a twelve inch record.

By this means the size of the record to be played determines the final positioning of the pick-up arm.

Gauge arm returning means

In order to enable a sequence of records of different diameter to be played, the gauge arms 177 must be raised before the next record is fed to the turntable in order that they may be ready to set the mechanism in accordance with the size of the record. This is secured by the following means. Suitably mounted on the main control shaft 122 is a pin 194 having an inclined surface. This pin 194 is so positioned that shortly after the commencement of movement of the main control shaft 122, i. e., shortly after a record has been played, it engages through an aperture 196 in the motor board 100 with a pin 197 on a lever 198 pivoted on the underside of the motor board 100. This lever 198 is pivoted about the same axis as the pawl 191 and, when moved by the pin 194, swings in an anti-clockwise direction as seen in Figures 18 and 19. The lever 198, during this movement, bears on a lug 400 (see Figures 18 and 19) formed on the pawl 191 and moves the latter out of engagement with the ratchet teeth 190. As soon as the pawl 191 is removed from the ratchet teeth 190 the gauge arms 177 will rise to their normal position under the action of the spring 192 controlling the same.

It will thus be seen that the gauge arms 177 are maintained in their depressed position for the whole time that the record is being played and are only raised to their position ready to set the mechanism for a new record after the preceding record has been played. The re-setting of the gauge arms takes place whilst the pick-up arm is being raised and before the next record is fed to the turntable.

Automatic cut-off mechanism

Means are provided to switch off the motor as soon as all the records have been played, and such means comprise two switches 199, 200 in parallel with one another in the motor circuit. One of these switches 199 is controlled by a cam 201 on the main control shaft 122 so that at that position of the main control shaft when the pick-up arm moves outwardly to its outermost position, the switch 199 is opened. Thus, this switch is opened every time a record is changed but, as it has in parallel with it the further switch 200, the motor circuit is not broken and the motor does not stop. The second switch 200 is controlled remains closed as long as there are any records on the rod, and only becomes open when all the records have been fed on to the turntable. Thus the motor circuit will only be broken at the end of playing of the whole of the records. The second switch control means above referred to comprise a pair of arms 202 pivoted together scissors fashion as at 203 (see Figures 5 and 6) at the centre of the horizontal part of the bridge structure 111. These arms 202, which are controlled by means of springs 204, extend downwardly and bear at their lower ends on the uppermost record on the store. The lower ends may be provided with rubber pads 205 to prevent the same damaging the sound grooves of the record. These arms 202, therefore, serve as pressure members to keep the lowermost record on the shoulder 114 formed by the off-set part 113 of the rod 218 ready for feeding on to the turntable. So long, therefore, as there are any records on the rod, these arms 202 are prevented from moving down under the action of their springs 204 but, as soon as the last record has been fed to the turntable, the arms fall to their lowermost position. One of these arms 202 is provided with a recess or cut away part 206 under which is disposed the turned-over part 207 of a lever 208 pivoted at 209 in the bridge structure. The further end of this lever 208 is bevelled off as at 210 so as to be capable of engagement with a nick 211 in a sliding switch control bar 212 mounted in the bridge structure. This switch bar 212 is provided with a projection 213 adapted to engage with the spring blade of the switch 200. So long as there are any records on the rod 112 the arms 202 do not fall to their lowest position and hence the one arm does not engage with the turned-over end 207 of the lever 208 (see Figure 5a). When the last record has been released, the arms 202 fall down to their lowest position, the recess 206 engages with the turned-over end of the lever 208 and swings it about its pivot to remove the bevelled end 210 from the nick 211 whereupon the switch control bar 212 moves back under the action of a spring (not shown) and the switch 200 opens. During this movement the parts move from the positions shown in Figure 5a to the positions shown in Figure 6a. When the mechanism is again loaded with records the arms 202 are again raised so that the lever 208 is again free to take up the position shown in Figure 5a but it cannot do this until the switch bar 212 is returned to the position shown in Figure 5a. This necessary movement of the switch bar 212 is imparted manually by pressing it in the direction opposite to that indicated by the arrow in Figure 5a. Such manual operation of the switch bar 212 is effected when it is desired to set the whole mechanism into operation and the switch bar 212 is then pressed inwards far enough for the bevelled end 210 of the lever 208 to fall into the nick 211 and keep the switch 200 closed. The manner in which the switches 199 and 200 are connected to the motor 103 is indicated in Figure 22.

Thus the motor circuit will be completed until after the last record has been played.

In addition to the cam 217, the spindle 214 also carries a cam surface 216 which, when the knob 215 is turned from the position shown in Figure 5 to that shown in Figure 6, bears on the arms 202 to raise them. The gauge arms 177 are also connected through flexible wires or the like 219 each to one of the arms 220, 221 of a bell crank lever this bell crank lever being connected through a flexible wire or the like 223 to a pin 224 on the spindle 214. This arrangement facilitates the charging of the record store because when the cam 217 is turned to bring the rod 218 into the position shown in Figure 6 so as to provide a smooth post onto which a stack of records can easily be threaded, the gauge arms are simultaneously lowered so that they do not impede the manual manipulation of the stack of records. When the knob 215 is returned to its normal position (Figure 5) to bring the rod 218 to its record supporting position, the cam surface 216 allows the arms 202 to bear on the upper record to keep the lowest record in the correct position. The gauge arms are simultaneously allowed to return to their normal positions.

Repeat mechanism (Figure 21)

It may be desired from time to time to play again a record which has just been played instead of passing immediately on to the next record. The means for enabling this to be done comprise a knob 225 suitably mounted on a spindle 226 in the motor board, this spindle 226 being provided on the underside of the motor board with an eccentric projection 227 which is located in a right angle slot 228 formed by bending one end of a longitudinal rod 229 slidably mounted in bearings 230 on the underside of the motor board 100. By this mounting of the eccentric projection 227, the knob 225 can assume three positions, one in which the offset direction of the projection lies idly in the slot (see Figure 3), and the other two (see Figure 21) in which it lies at right angles to the slot and parallel to the length of the longitudinal rod, one position on each side of the centre.

The centre position (Figure 3) is the normal position in which the mechanism functions as above, and the other two positions are one "Reject", the lower position of Figure 21 (which will be described hereinafter), and the other "Repeat."

Now for the repetition of a record, it is necessary to move the pick-up arm and it is necessary (I) to prevent the feeding of a new record and (II) to prevent the gauge arms 177 returning to their raised position since, if they returned to their raised position, the pawl would be removed from the ratchet on the arcuate lever and the pick-up arm would not return to the correct position unless it were the smallest size of record that was being played. It is for this reason that the gauge arms are not raised until after the record has been played.

Movement of the longitudinal rod consequent upon the setting of the knob 225 to the repeat position (the upper position of Figure 21) is adapted to secure this operation as follows. Attached to the longitudinal rod 229 is an arm 232 having at one end a fork 233, this fork 233 taking about the turned-over arm 174 which is pivoted in the pivoted plate in such a manner as to move the same clear of the boss. Thus, since this arm 174 is clear of the boss 176 a new record cannot be fed to the turntable. The end of the rod 229 remote from the knob 225 is bent upwardly as shown in Figure 11 and the arm or lever 198 is caused to bear against this bent up part by a spring 401. Thus when the rod 229 is moved to the repeat position (upper view in Figure 21), not only is the record feed mechanism rendered inoperative as a result of the movement of the arm 174, but also the arm or lever 198 spring 401 to a position such that the pin 197 on the lever 198 is out of the path of the pin 194 on the control shaft 122. This movement of the lever 198 is anti-clockwise as seen in Figure 9 and clockwise as seen in Figures 18 and 19, which is to say that the lever 198 moves away from the lug 400 so that the pawl 191 is unaffected by the movement.

The arcuate arm 188, therefore, remains in its set position and the pick-up arm will be raised, moved outwardly and returned to its correct position without, however, the gauge arms being affected. Also, as described above no fresh record is fed to the turntable.

Reject mechanism

In order to reject the record being played, i. e., to feed a new record on to the turntable, it is merely necessary to set the mechanism into operation again, and this is effected by turning the knob 225 to the reject position (the lower position of Figure 21. This moves the rod 229 to the left (as seen in Figure 21) so that a collar 234 on the rod 229 engages the release arm 131 and moves it out of engagement with the arm 128 of the pawl 126. This results in the pick-up arm manipulating mechanism and record-changing mechanism being set into operation so that a new record is brought into playing position and played. When the rod 229 is put into the reject position, the arm 174 is moved to the position shown in the lower view in Figure 21 in which it could not be acted upon by the boss 176 for effecting the release of another record to be played. However, as soon as the operator releases the knob 225 after turning it to the reject position, a leaf spring 402 acts on the eccentric projection 227 to return the rod 229 to its central position so that the arm 174 returns to its central position in time to be engaged by the boss 176 for effecting the release of another record to be played. It will be appreciated, therefore, that while the knob 225 must be turned manually from the repeat position to the normal position, it returns to the latter position automatically from the reject position.

It will thus be seen that the device according to the present invention will enable records to be played one after the other (with repeat or reject at will) in a pre-selected order, irrespective of their diameter.

I claim:

1. In mechanism for playing in succession a number of talking machine records a magazine post, for supporting a stack of records, including relatively movable parts adapted to pass through the central apertures in said records, said parts being so formed that when in one position relatively to each other they provide a shoulder for supporting said stack but that when in another position relatively to each other they present a substantially smooth post, means for manipulating at least one part of said post to effect alternately a change over from said former position to said latter position for enabling a stack of records to be threaded easily upon said post and a change back to said first mentioned position to bring said shoulder to its operative position for supporting said stack, and a record releasing member adapted to extend through the central apertures in a stack of records supported by said post and operative to engage the edge of the central aperture of the lowermost record in the stack so as to impart lateral movement to this record sufficient to enable its central aperture to clear said shoulder thereby enabling the record to fall from said post.

2. In mechanism for playing in succession a number of talking machine records, a substantially vertical member formed at its lower end with a horizontal shoulder, and adapted to pass through the central apertures in a stack of records so that the latter are supported by said shoulder, a second member also adapted to pass through the stack of records and extending downwards substantially as far as said shoulder, means for moving one of said members relatively to the other into and out of a position in which said second member covers said shoulder thereby providing a substantially smooth post upon which a stack of records may easily be threaded, a third member adapted to extend through the central apertures in the stack of records and formed with a lateral projection of thickness slightly less than the thickness of each record which the mechanism is designed to play, and means operative to move said third member so that said projection moves over said shoulder for pushing the lowermost record in said stack laterally by an amount sufficient to enable its central aperture to clear said shoulder with the result that said lowermost record falls out of engagement with said first-mentioned member.

3. In mechanism for playing in succession a number of talking machine records, a magazine post, for supporting a stack of records, including two relatively movable parts adapted to pass through the central apertures in said records, said parts being so formed that when in one position relatively to each other they provide a shoulder for supporting said stack but that when in another position relatively to each other said parts present a substantially smooth post, means for moving one of said parts relatively to the other to effect alternately a change over from said former position to said latter position for enabling a stack of records to be threaded easily upon said post and a change back to said first-mentioned position to bring said shoulder to its operative position for supporting said stack, means operative to impart a lateral movement successively to each record in the stack to enable its central aperture to clear said shoulder so that it falls from said post, a device adapted to engage and steady the uppermost record in the stack and arranged to move to a stationary position when this uppermost record is discharged from said post, and means operatively connected to said steadying device for rendering the mechanism inoperative upon such movement of said steadying device, said device being adapted to be acted upon by said means for moving one of said parts of said post relatively to the other of said parts and thereby to be shifted from said stationary position when said post is changed over from said first mentioned position to said smooth position.

4. In mechanism for playing in succession a number of records, a turntable for supporting records during playing, a bridge structure spanning said turntable, a magazine post for supporting a stack of records extending vertically downwards from said post towards the centre of said turntable and including relatively movable parts adapted to pass through the central apertures in said records, said parts being so formed that when in one position relatively to each other they provide a shoulder for supporting said stack but that when in another position relatively to each other they present a substantially smooth post, means for manipulating at least one part of said post to effect alternately a change over from said former position to said latter position for enabling a stack of records to be threaded easily upon said post and a change back to said first-mentioned position to bring said shoulder to its operative position for supporting said stack, a record releasing member adapted to extend through the central apertures in a stack of records supported by said post and operative to engage the edge of the central aperture of the lowermost record in the stack so as to impart lateral movement to this record sufficient to enable its central aperture to clear said shoulder thereby enabling the record to fall from said post to said turntable, operating means for said releasing member, and connecting means within said bridge structure operatively connecting said operating means with said releasing member.

5. In mechanism for playing in succession a number of talking machine records, a magazine post for supporting a stack of records, including two relatively movable parts adapted to pass through the central apertures in said records, said parts being so formed that when in one position relatively to each other they provide a shoulder for supporting said stack and an abutment on the side of said post remote from said shoulder at a point displaced above the level of said shoulder by an amount slightly greater than the thickness of each record that the mechanism is designed to play, but that when in another position relatively to each other said parts present a substantially smooth post, means for moving one of said parts relatively to the other to effect alternately a change over from said former position to said latter position for enabling a stack of records to be threaded easily upon said post and to effect a change back to said first-mentioned position to bring said shoulder to its operative position for supporting said stack.

6. The combination claimed in claim 5 and a pivoted record releasing member adapted to extend through the central apertures in a stack of records supported by said shoulder and formed at its lower end with a toe adapted to slide beneath the lowermost record but one in said stack, and means for rocking said releasing member to bring said toe into engagement with the edge of the central aperture in the lowermost record in the stack and thus to impart a lateral movement to this record for enabling its central aperture to clear said shoulder while said abutment prevents lateral movement from being imparted to the lowermost record but one.

7. In automatic mechanism, including a soundbox or pick-up for playing in succession a number of talking machine records which may be of at least three different diameters, a turntable for supporting said records during playing, a magazine post located above said turntable, means operative to cause records to pass downwards one by one from said post to said turntable, a plurality of feelers arranged above and symmetrically about the periphery of said turntable and adapted to be engaged by the edge of each of the records that the mechanism is adapted to play, except records of the smallest diameter, as said record passes downwardly to the turntable, and to be displaced thereby to an extent corresponding to the diameter of said record, means interconnecting said feelers and operative to cause them to move simultaneously and similarly when engaged by a record, an elewhen the latter are moved by a record, and actuating means for moving said pick-up or sound-box to a position above the edge of a record when the latter has reached said turntable, said actuating means being controlled by said element at least when the record to be played has engaged said feelers.

8. In automatic mechanism, including a sound-box or pick-up, for playing in succession a number of gramophone records which may be of at least three different diameters, a turntable for supporting said records during playing, a vertical magazine post located vertically above said turntable and adapted to support a stack of records, means for causing said records to pass in succession from said post to said turntable, a plurality of feelers arranged above and symmetrically about the periphery of said turntable and adapted to be engaged by the edge of each of the records that the mechanism is adapted to play, except records of the smallest diameter, as said record passes downwardly to the turntable, and to be displaced thereby to an extent corresponding to the diameter of said record, means interconnecting said feelers and operative, when the latter are engaged by a record passing from said magazine post to said turntable, to cause said feelers to be displaced simultaneously to positions spaced from the common axis of said magazine post and of said turntable by an amount equal to the radius of the record causing the displacement, and means operative in accordance with the displacement of said feelers to move said sound box or pick-up to a position above the edge of a record when the latter has reached said turntable.

9. In mechanism for playing in succession a number of gramophone records which may be of at least three different diameters, a turntable for supporting said records during playing, a magazine post located above said turntable, means for causing said records to pass one by one from said magazine post to said turntable, an arm pivoted about a vertical axis, a pick-up or sound-box mounted at one end of said arm remote from said axis, a cam operative to move together with said arm as said arm swings about said axis, a number of feelers disposed about the path of the edges of at least those records that are of greater diameter than the smallest record which the mechanism is designed to play and adapted to be engaged and moved by said records as they pass from said magazine post to said turntable, means interconnecting said feelers so that they move simultaneously and similarly when engaged by a record, a second cam operatively connected to said feelers so that its position corresponds to the displacement of said feelers when a record is fed to said turntable, a movable member adapted first to engage said first-mentioned cam and subsequently to engage said second cam so that said second cam shifts the movable member out of engagement with said first mentioned cam and said pick-up is brought to the edge of a record fed to said turntable after having been moved for a period terminated by the shifting of said movable member from said first mentioned cam.

10. In automatic mechanism, including a sound-box or pick-up, for playing in succession a number of talking machine records which may be of at least three different diameters, a turntable for supporting said records during playing, means operative to cause records to pass downwards one by one from said post to said turntable, a plurality of feelers arranged to be engaged and moved by the edges of at least all but the smallest records that the mechanism is designed to play as they move from said magazine post to said turntable, means interconnecting said feelers and operative to cause them to move simultaneously and similarly when engaged by a record, ratchet and pawl mechanism operative to be set in various positions according to the amount of movement imparted to said feelers by records passing to said turntable from said post and means under the control of said ratchet and pawl mechanism for moving said pick-up or sound-box to the edge of each record when it reaches said turntable.

11. In automatic mechanism, including a sound-box or pick-up, for playing in succession a number of talking machine records which may be of at least three different diameters, a turntable for supporting said records during playing, a magazine post located above said turntable, means operative to cause records to pass downwards one by one from said post to said turntable, a plurality of feelers arranged to be engaged and moved by the edges of at least all but the smallest records that the mechanism is designed to play as they move from said magazine post to said turntable, means interconnecting said feelers and operative to cause them to move simultaneously and similarly when engaged by a record, an element adapted to be moved by an amount corresponding to the displacement of said feelers when the latter are moved by a record, and a resilient driving connection operative to move said pick-up or sound-box towards the edge of each record delivered from said magazine post to said turntable and arranged to yield out of operative connection with said pick-up or sound-box upon encountering said element so that said pick-up or sound-box is moved a distance corresponding to the size of the record to be played.

12. In mechanism for playing in succession a number of talking machine records, a magazine post including two parts, means for moving one of said parts relatively to the other between an operative and an inoperative position, one of said parts being formed with a shoulder which, when said movable part is in said operative position, projects on one side of said post so as to underlie the lowermost record of a stack of records threaded on the post and thereby to support the stack of records, and the other of said parts being formed with an abutment which, when said movable part is in said operative position, projects from said post on the side thereof remote from said shoulder at a point slightly above the top surface of the lowermost record in the stack of records, and means operative to impart a lateral movement to the lowermost record in the stack to enable its central aperture to clear said shoulder so that said record is free to move downwards out of engagement with said post while said abutment prevents the other records from being carried laterally with the lowermost record, said two parts being so arranged that when said movable part is in said inoperative position, said abutment and said shoulder are in positions relatively to each other such that said post is substantially smooth to facilitate loading records thereon.

13. In mechanism for playing in succession a number of talking machine records, a substanpart and a movable part adapted to swing about a horizontal axis, means for swinging said movable part between an operative and an inoperative position, one of said parts being formed with a shoulder which, when said movable part is in said operative position, projects on one side of said post so as to underlie the lowermost record of a stack of records threaded on the post and thereby to support the stack of records, and the other of said parts being formed with an abutment which, when said movable part is in said operative position, projects from said post on the side thereof remote from said shoulder at a point slightly above the top surface of the lowermost record in the stack of records, and means operative to impart a lateral movement to the lowermost record in the stack to enable its central aperture to clear said shoulder so that said record is free to move downwards out of engagement with said post while said abutment prevents the other records from being carried laterally with the lowermost record, said two parts being so arranged that when said movable part is in said inoperative position, said abutment and said shoulder are in positions relatively to each other such that said post is substantially smooth to facilitate loading records thereon.

14. In mechanism for playing in succession a number of talking machine records a substantially vertical magazine post including a fixed part and a movable part adapted to swing about a horizontal axis, means for swinging said movable part between an operative and an inoperative position, one of said parts being formed with a shoulder which, when said movable part is in said operative position, projects on one side of said post so as to underlie the lowermost record of a stack of records threaded on the post and thereby to support the stack of records, and the other of said parts being formed with an abutment which, when said movable part is in said operative position, projects from said post on the side thereof remote from said shoulder at a point slightly above the top surface of the lowermost record in the stack of records, and a member, pivoted about a horizontal axis, disposed so as to pass through the central apertures in a stack of records supported by said shoulder and operative upon swinging about its axis to engage the edge of the central aperture of the lowermost record in the stack and move this record laterally to enable its central aperture to clear said shoulder so that said record is free to move downwards out of engagement with said post while said abutment prevents the other records from being carried laterally with the lowermost record, said two parts being so arranged that when said movable part is in said inoperative position, said abutment and said shoulder are in positions relatively to each other such that said post is substantially smooth to facilitate loading records thereon.

magazine post for supporting a store of records adjacent the central openings thereof, comprising a laterally-movable projection adapted when in laterally extended position to engage the under surface of, and to support, the lowermost of said records while one or more records remain within said store, a second laterally-movable projection adapted during movement toward laterally extended position to engage the periphery of the central opening of, and to displace laterally, the lowermost of said records to an extent sufficient to cause it to clear the first-mentioned projection and thereby discharge a record from said store, and means for retracting each of said projections whereby the post may be made smooth to facilitate threading thereon a fresh store of records.

16. In a gramophone having a motor, the combination of a magazine post for supporting a store of records adjacent the central openings thereof, comprising a laterally-movable projection adapted when in laterally extended position to engage the under surface of, and to support, the lowermost of said records while one or more records remain within said store, a second laterally-movable projection adapted during movement toward laterally extended position to engage the periphery of the central opening of, and to displace laterally, the lowermost of said records to an extent sufficient to cause it to clear the first-mentioned projection and thereby discharge a record from said store, means actuated by the motor upon completion of playing of a previous record for moving said second-mentioned projection in a direction to discharge a record from said store, and manual means operable at will to retract said first-mentioned projection whereby the post may be made smooth for facilitating threading thereon a fresh store of records.

17. In a gramophone having a motor and a pick-up arm having a needle, the combination of a magazine post for supporting a store of records adjacent the central openings thereof, comprising a laterally-movable projection adapted when in laterally extended position to engage the under surface of, and to support, the lowermost of said records while one or more records remain within said store, a second laterally-movable projection adapted during movement toward laterally extended position to engage the periphery of the central opening of, and to displace laterally, the lowermost of said records to an extent sufficient to cause it to clear the first-mentioned projection and thereby discharge a record from said store, gauge means actuated upon discharge of a record from said store for guiding said needle to initial position for playing said record so discharged, and means actuated upon discharge of the last record from said store for moving said gauge means to inoperative position to facilitate loading a fresh store of records to said post.

ALBERTO COMPARE.